(12) United States Patent
Nakano et al.

(10) Patent No.: US 7,234,559 B2
(45) Date of Patent: Jun. 26, 2007

(54) REAR FENDER AND RELATED SUPPORT STRUCTURE FOR A MOTORCYCLE, AND MOTORCYCLE INCLUDING SAME

(75) Inventors: Toshinori Nakano, Saitama (JP); Terunati Saiki, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 101 days.

(21) Appl. No.: 10/920,041

(22) Filed: Aug. 17, 2004

(65) Prior Publication Data
US 2005/0051374 A1 Mar. 10, 2005

(30) Foreign Application Priority Data
Sep. 9, 2003 (JP) ............... 2003-317140
Sep. 9, 2003 (JP) ............... 2003-317141

(51) Int. Cl.
B62B 9/16 (2006.01)
B62D 25/16 (2006.01)
B62D 61/02 (2006.01)

(52) U.S. Cl. ............ 180/219; 280/152.1; 280/152.2; 280/159; 280/160

(58) Field of Classification Search ......... 280/152.1, 280/152.2, 159, 160, 852; 180/219
See application file for complete search history.

(56) References Cited

U.S. PATENT DOCUMENTS

| | | | | |
|---|---|---|---|---|
| 4,485,884 A | * | 12/1984 | Fukunaga et al. | 180/219 |
| 4,500,101 A | * | 2/1985 | Aoki | 280/152.1 |
| 5,299,832 A | | 4/1994 | Price, Sr. | |
| 5,952,729 A | * | 9/1999 | Shiratori et al. | 307/9.1 |
| 6,073,948 A | * | 6/2000 | Motojima et al. | 280/152.2 |
| 6,203,093 B1 | * | 3/2001 | Suzuki et al. | 296/78.1 |
| 6,257,362 B1 | * | 7/2001 | Scherbarth | 180/219 |
| 6,318,743 B1 | * | 11/2001 | Nakashima et al. | 280/152.1 |
| 6,520,275 B2 | * | 2/2003 | Galbraith et al. | 180/219 |
| 6,695,330 B2 | * | 2/2004 | Hata | 280/152.3 |
| 6,779,620 B2 | * | 8/2004 | Taniguchi et al. | 180/219 |
| 6,889,789 B2 | * | 5/2005 | Kurayoshi et al. | 180/219 |
| 2002/0029917 A1 | | 3/2002 | Galbraith et al. | |

FOREIGN PATENT DOCUMENTS

JP 06032268 2/1994
JP 2003089375 A 3/2003

* cited by examiner

*Primary Examiner*—Lesley D. Morris
*Assistant Examiner*—Marc A. Scharich
(74) *Attorney, Agent, or Firm*—Carrier, Blackman & Associates, P.C.; William D. Blackman; Joseph P. Carrier

(57) ABSTRACT

An improved fender structure for a motorcycle includes a rear fender for covering a rear wheel, and a support stay for supporting the rear fender on a motorcycle body frame. The support stay extends along an inner surface of the rear fender, from the motorcycle body frame to the rear end of the rear fender. The support stay also supports a tail lamp body that is provided on an exterior surface of the rear fender. The front end of the rear fender includes a contact portion that interacts with the motorcycle body frame. The improved fender structure provides sufficient rigidity for a rear end portion of the rear fenders while achieving a simplified fender shape, reducing molding costs, and improving the external appearance. The improved fender structure also permits easy assembly of the rear fender to the motorcycle.

17 Claims, 11 Drawing Sheets

REAR FENDER AND RELATED SUPPORT STRUCTURE FOR A MOTORCYCLE, AND MOTORCYCLE INCLUDING SAME

CROSS-REFERENCE TO RELATED APPLICATIONS

The present invention claims priority under 35 USC 119 based on Japanese Patent Application No. 2003-317140, filed Sep. 9, 2003, and on Japanese Patent Application No. 2003-317141, filed Sep. 9, 2003. The complete disclosures of each of the above-referenced Japanese applications is incorporated by reference herein.

BACKGROUND OF THE INVENTION

1. Field of the Invention

The present invention relates to a motorcycle and rear fender therefor, in which a rear fender is supported on a frame covering a rear wheel from above, and a lamp body is disposed on a widened portion of the rear fender. More particularly, the present invention relates to an improvement in a rear fender structure, in a rear fender of a type formed with a substantially U-shaped cross section, including a pair of side plates arranged on opposite sides of the rear wheel, a bight portion interconnecting upper edges of the side plates, and an open lower portion. Each side plate is provided with a widened portion at the rear end of the rear fender, and each of the side plates has a turn indicator lamp mounted to a support structure and extending outwardly from the widened portion thereof.

2. Description of the Background Art

A motorcycle in which a rear fender, having a widened portion at a rear end thereof, is supported on a support frame covering a rear wheel from above, and which includes a lamp body disposed on the widened portion is known from, for example, Japanese Laid-open Patent No. 2003-89375.

In the rear fender disclosed in this reference, both left and right sides of the rear fender are bolted to the body frame of the motorcycle. In the design of Japanese Laid-open Patent No. 2003-89375, the rear end of the rear fender is spaced apart at an extended distance from the connection point where the rear fender is mounted to the vehicle frame. Moreover, in this known design, the lamp body is secured to the rear fender, placing stress thereon. Therefore, it is required that the rigidity of the rear end of the rear fork be enhanced.

In the above-described conventional art, in order to strengthen the fender, a jagged portion is formed on the rear end of the rear fender by press molding an iron plate, to provide the rigidity on the rear fender itself. In this case, when the rear fender is enlarged, a mold for press molding the rear fender is also enlarged. The mold for forming the jagged portion also becomes complicated in terms of achieving rigidity.

In addition, the weight of the rear fender is increased in the known fender design, because the rear fender disclosed is large and covers even the rear-most portions of the rear wheel, and further because the lamp body is mounted to the rear fender. Therefore, a need exists for a rear fender that is easily assembled to the vehicle body, despite the size and weight of the rear fender.

SUMMARY OF THE INVENTION

The present invention is accomplished in view of the aforementioned difficulties with the known fender designs. It is an object of the present invention to provide a rear fender structure of a motorcycle having sufficient rigidity at a rear end of the rear fender, while achieving a simplified shape for the rear fender, and controlling molding costs.

A motorcycle rear fender, according to a selected embodiment of the present invention, permits enhanced design freedom with regard to the shape of the rear fender, enhanced external appearance of the rear fender, and is easily assembled to the vehicle body.

The present invention achieves the above-described objects by providing a motorcycle in which a rear fender is substantially U-shaped in cross section, with an open lower portion. In a first illustrative embodiment of the invention, a rear fender for a motorcycle includes a pair of side plates arranged on opposite sides of a rear wheel, and each of the side plate includes a widened portion at the rear end thereof. The widened portions of the respective side plates are made larger than other portions of the rear fender, and cooperate to form a widened portion at the rear end of the rear fender.

The rear fender is supported on a frame-like support stay that covers the rear wheel from above, and a lamp body is disposed on the widened portion of the rear fender. The support stay extends along the inner surface of the rear fender to the widened portion thereof, so as to support the widened portion from inside. The lamp body is mounted on, and is supported by, the support stay.

According to another aspect of the invention, in addition to the structure described above, the support stay includes a pair of left and right side plate support portions extending from the vehicle body frame to the widened portion along the inner side of the rear fender. The support stay also includes an integrally formed connection portion bent rearwardly and upwardly from the rear ends of the respective side plate support portions, and is substantially U-shaped, as viewed from above. The connection portion joins the respective rear ends of the side plate support portions, and the lamp body is supported on the connection portion.

According to another aspect of the invention, in addition to the structure described above, the rear fender is supported on the support stay with elastic vibration dampener members interposed between the support stay and the rear fender.

According to another aspect of the invention, in addition to the structure described above, the rear fender is formed of synthetic plastic.

According to another aspect of the invention, the fender is provided with a contact portion extending from the front thereof. The contact portion is provided to contact the underside of a portion of the body frame, forward of a center of gravity of the rear fender.

According to another aspect of the invention, in addition to the structure of the invention described above, the contact portion is provided in front of the rear fender so as to come in contact with the underside of a cross member that extends between a pair of left and right frame members provided on the body frame.

According to yet another aspect of the invention, in addition to the structure of the invention described above, the contact portion is provided with a plurality of contact portions, each of which are formed to be rib-like and project upwardly, and which extend forwardly on the front of the rear fender.

As a result of providing a rear fender with the inventive features described above, both the rear fender and the lamp body, disposed on the widened rear end portion of the rear fender, are supported by the support stay, mounted on the vehicle body frame. Therefore, sufficient rigidity of the rear end portion of the rear fender is achieved, the shape of the rear fender is simplified, the molding cost is reduced, and freedom of design of the shape of the rear fender is enhanced. Moreover, the support stay is arranged inside of the rear fender, and is not seen from outside, thus enhancing external appearance of the rear fender.

According to an illustrative embodiment of the invention, both side plate support portions of the support stay extend to the widened portion along the inner surface of the rear fender. The connection portion of the support stay is formed to be substantially U-shaped as viewed from above, and provides a connection between the rear ends of the respective side plate support portions. The connection portion is bent rearwardly and upwardly from the rear end of the side plate support portions.

The lamp body is mounted on the connection portion of the support stay. Therefore, the lamp body can be supported more firmly than it would otherwise be where no support stay is provided, and the support stay concurrently positively supports the widened portion of the rear fender.

According to one aspect of the present invention, vibrations of the rear fender are reduced or eliminated by providing the vibration-damping elastic members between the support stay and the rear fender.

According to another aspect of the present invention, weight of the rear fender can be reduced to enhance the effect of the support provided by the support stay.

According to another aspect of the invention, when the rear fender is mounted on the vehicle body frame, the contact portion extending from the front of the rear fender is placed in contact with the underside of a portion of the body frame, and subsequently, both sides of the rear fender are fastened to the body frame. Since the center of gravity of the rear fender is rearward of the fastened position, there is a tendency for the rear fender to rotate about the center of gravity during assembly, and the front end of the rear fender tends to move upward. However, the contact portion prevents this rotation, since it contacts the vehicle body frame in such a manner as to prevent rotational movement. Thus, assembly of the rear fender into the vehicle body frame is easily accomplished.

According to another aspect of the present invention, the contact portion is placed in contact with the underside of a cross member that extends between a pair of left and right frame members. Therefore, the contact area between the contact portion and the cross member of the body frame can be relatively large, and the rotational movement of the rear fender is positively prevented during assembly, so as to stabilize the rear fender during assembly.

According to still another aspect of the present invention, because of its shape, the contact area provides structural reinforcement for the rear fender, and thus rigidity of the rear fender is enhanced.

For a more complete understanding of the present invention, the reader is referred to the following detailed description section, which should be read in conjunction with the accompanying drawings. The following description of selected illustrative embodiments is intended to illustrate, rather than to limit the invention. Throughout the following detailed description and in the drawings, like numbers refer to like parts.

DETAILED DESCRIPTION OF ILLUSTRATIVE EMBODIMENTS

Overview

Figure 1:
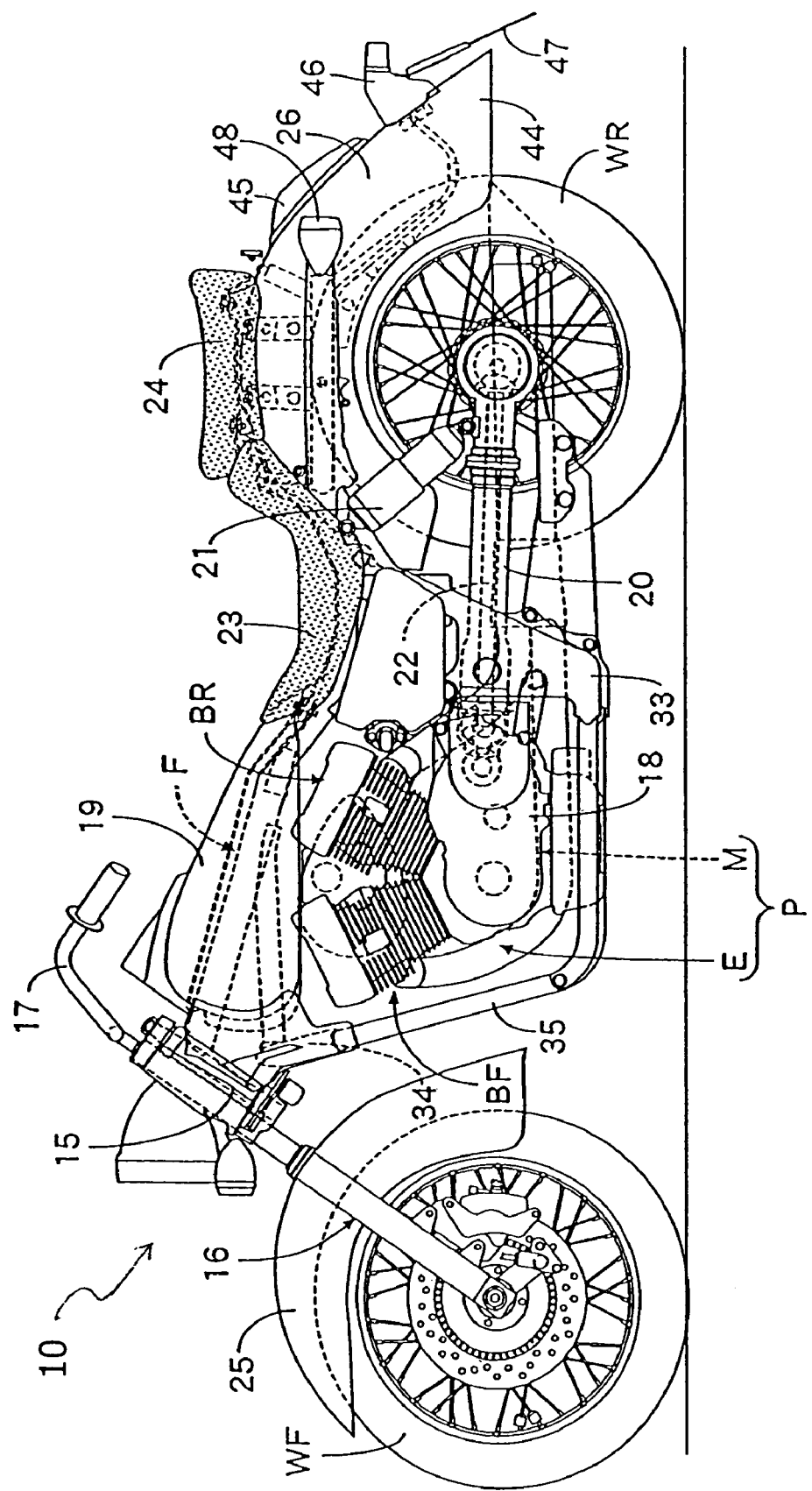
FIG. 1 is a side elevational view of a motorcycle, showing a support stay in broken lines within the rear fender, according to a first illustrative embodiment of the present invention.

Referring now to the drawings, FIG. 1 illustrates a motorcycle 10, of a type intended for normal street use, and which incorporates a rear fender and related support structure according to a selected illustrative embodiment of the present invention. As shown in FIG. 1, the motorcycle 10 includes a body frame F including a head pipe 15 at the front end thereof, as well as other frame components which will be described subsequently.

The head pipe 15 pivotally supports a front fork 16 therein, with a front wheel WF rotatably supported at the lower end of the front fork. Handlebars 17 are connected to an upper end of the front fork 16, to allow steering of the motorcycle 10.

A powertrain unit P, including an engine E and a transmission M encased in a crankcase 18 of the engine E, is mounted on a front centrally portion of the body frame F, as shown. A fuel tank 19 is mounted on the front portion of the body frame F above the powertrain unit P, so as to cover the engine E from above.

A pair of left and right swing arms 20 extend in a longitudinal direction, and are pivotally supported on a pivot shaft 31 (FIG. 2), which is affixed to the body frame F rearward of the powertrain unit P. Front ends of the swing arms 20 are pivotally mounted to the frame F, so that the swing arms 20 are vertically swingable. A rear wheel WR is rotatably supported between the rear ends of both swing arms 20.

Rear shock absorbers 21 are respectively interposed between the body frame F and the rear portions of the swing arms 20 on each side of the frame. Moreover, the left swing arm 20 is formed to be a hollow tube, and a drive shaft 22 is housed inside of the left swing arm 20, for transmitting power from the powertrain unit P to the rear wheel WR.

A main seat 23 is mounted on the body frame F behind the fuel tank 19, for supporting an operator thereon, and a pillion seat 24 is mounted on the body frame F behind the main seat 23, for supporting a passenger.

A front fender 25, covering the front wheel WF from above, is mounted on the front fork 16. Similarly, a rear fender 26, covering the rear wheel WR from above, is mounted on the rear portion of the body frame F.

Frame Structure

Figure 2:
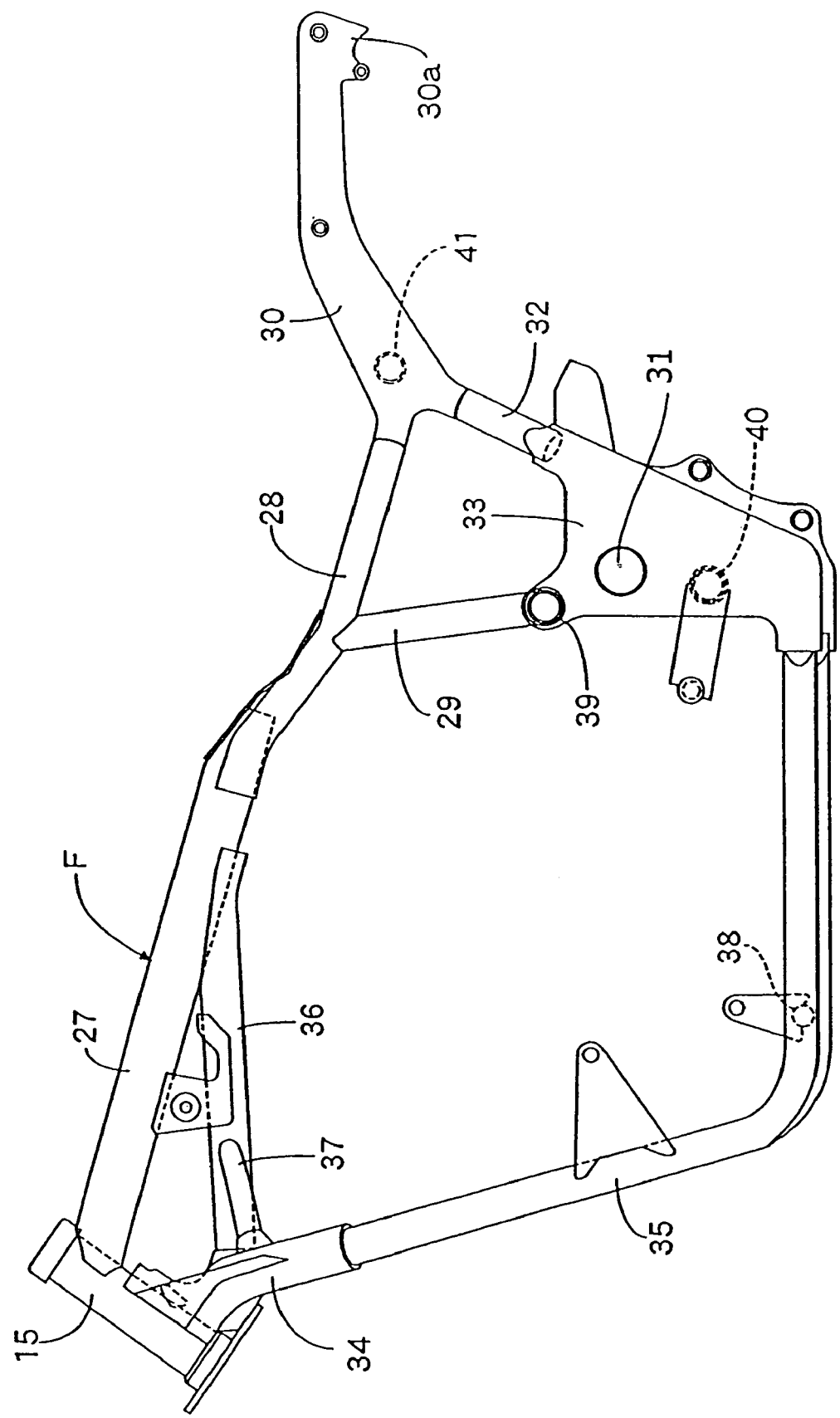
FIG. 2 is a side plan view of an isolated body frame for the motorcycle of FIG. 1.

As shown in FIG. 2, the body frame F includes the head pipe 15 at the front end thereof, a main frame pipe 27 extending rearwardly and downwardly from an upper portion of the head pipe 15, and a pair of left and right upper central pipes 28, welded to the rear portion of the main frame pipe 27 and extending rearwardly therefrom. The frame F also includes a pair of vertical center pipes 29, with one of these vertical center pipes extending downwardly from a respective intermediate portion of each of the upper central pipes 28, as shown.

The body frame F also includes a pair of left and right seat rails 30 which extend rearwardly from the back of the respective upper central pipes 28. The upper front end portions of the seat rails 30 are welded to the rear ends of the respective upper central pipes 28.

The body frame F further includes rear connector pipes 32 that extend downwardly from lower front end portions of the seat rails 30. A pair of left and right pivot plates 33 connect the lower portions of the vertical center pipes 29 and the rear connection pipes 32.

At the front end of the body frame F, a respective support socket 34 is welded to the lower portion of the head pipe 15 on each side thereof, and a pair of substantially V-shaped left and right down pipes 35 extend downwardly from the support sockets 34, and curve to extend back to the pivot plates 33. A tension pipe 36 connects intermediate portions of the support sockets 34 and the main frame pipe 27.

The body frame F also includes a pair of left and right reinforcing pipes 37, mounted between both left and right sides of the respective support sockets 34 and the front portion of the tension pipe 36.

The body frame F also includes a plurality of transversely oriented cross pipes 38, 39, 40, 41, each extending substantially horizontally between the duplicate side sections of the body frame F in a direction substantially transverse to the longitudinal axis of the motorcycle 10. A first transversely oriented cross pipe 38 joins the intermediate portions of the down pipes 35 near the angular bend thereof. A second transversely oriented cross pipe 39 extends between the vertical center pipes 29 at the connection portions of the vertical center pipes 29 and the pivot plates 33. A third transversely oriented cross pipe 40 extends between both pivot plates 33 below the pivot shaft 31, and a fourth transversely oriented cross pipe 41 extends between the front portions of the seat rails 30.

The down pipe 35 is formed such that the intermediate portion thereof is bent to form an angle of approximately 120 degrees. Accordingly, the front half portion of each of the down pipes 35 extends rearwardly and downwardly from its respective support socket 34, and the rear half portion of each down pipe 35 extends substantially horizontally rearwardly toward the lower end of the pivot plate 33.

A bracket 30a for mounting an optional helmet holder (not shown) is integrally provided on the rear portion of the left seat rail 30, in the depicted embodiment of the body frame F.

Engine Mounting Structure

The engine E shown in the drawing is a V-shaped engine, in which a front bank BF and a rear bank BF are arranged to form an approximate V-shape. The lower portion of the engine E, forward of the crankcase 18, is supported on the first cross pipe 38 that extends transversely between the down pipes 35 in the body frame F. The upper portion of the engine E, rearward of the crankcase 18, is supported on the second cross pipe 39 that extends transversely between the vertical center pipes 29 at the connection portions of the vertical center pipes 29 and the pivot plates 33. The lower portion of the engine E, rearward of the crankcase 18, is supported on the third cross pipe 40 that extends transversely between both pivot plates 33. Further, the front portions of both swing arms 20 are swingably supported on the pivot shaft 31, which extends between the pivot plates 33 in a direction transverse to the longitudinal axis of the motorcycle 10.

Rear Fender and Related Hardware

As shown in FIGS. 3 to 6, the rear fender 26 is formed with an inverted substantially U-shaped cross section, and is arranged over the rear wheel WR such that its lower portion is open. The rear fender 26 includes a pair of side plates 26a, 26a arranged on opposite sides of the rear wheel WR, and a bight portion interconnecting the side plates. The rear fender 26 further has a widened portion 44 at its rear end (FIGS. 1, 3), in which the width of each of the side plates 26a, 26a is larger than other portions of the rear fender 26. The rear fender 26 may be formed of synthetic plastic material.

A brake lamp 45 is mounted behind and below the pillion seat 24, and above the rear fender 26. A license lamp 46, including a lamp housing 79, is disposed on the widened portion 44 of the rear fender 26 below the brake lamp 45. A license plate 47 is mounted on the lamp housing 79 of license lamp 46, and is illuminated by the license lamp 46. Further, rear turn indicator lamps 48, 48 are disposed on opposite sides of the rear fender 26 in front of the brake lamp 45.

Figure 5:
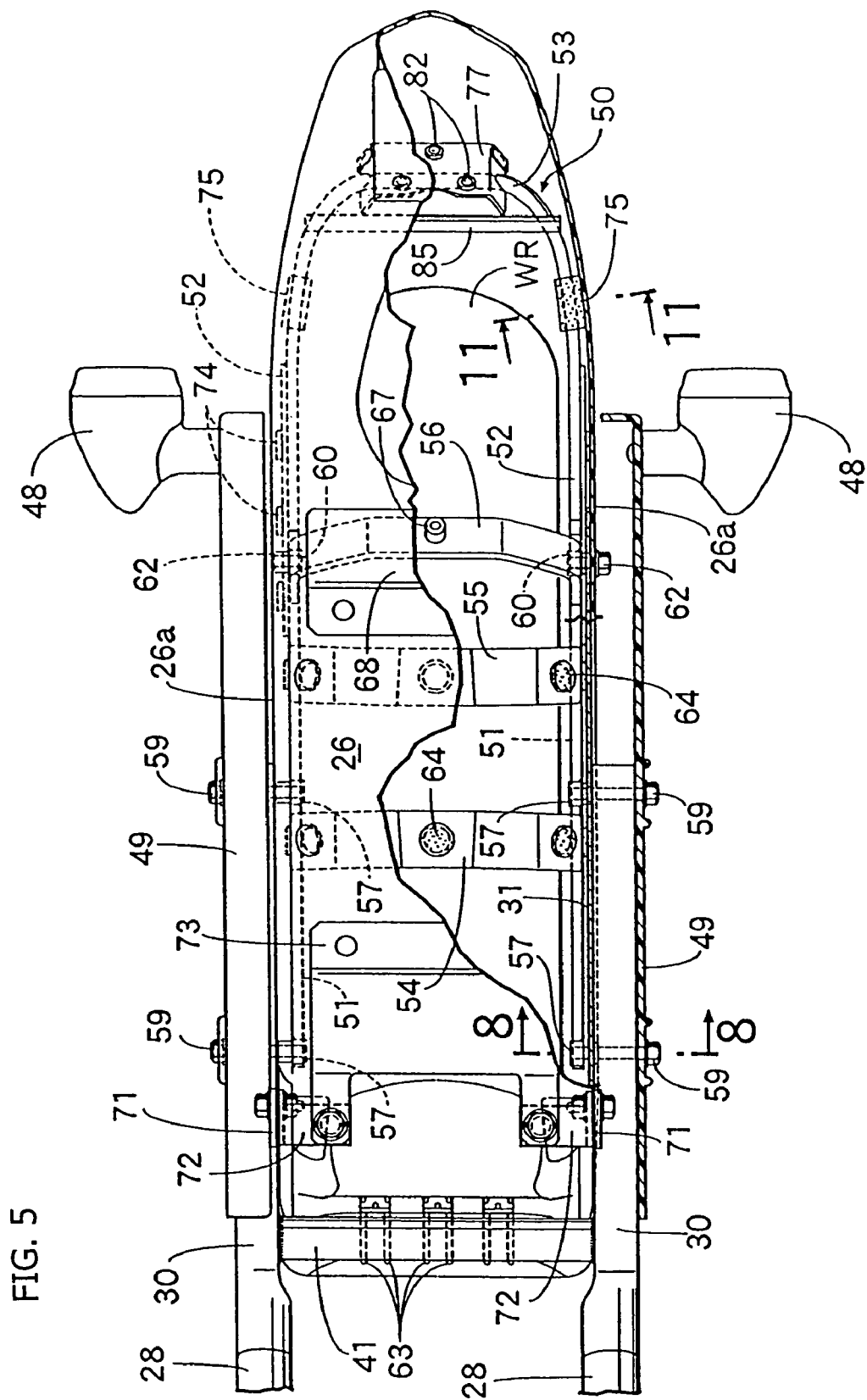
FIG. 5 is a top plan view of the rear fender of FIG. 4, taken along the line 5—5.
Figure 6:
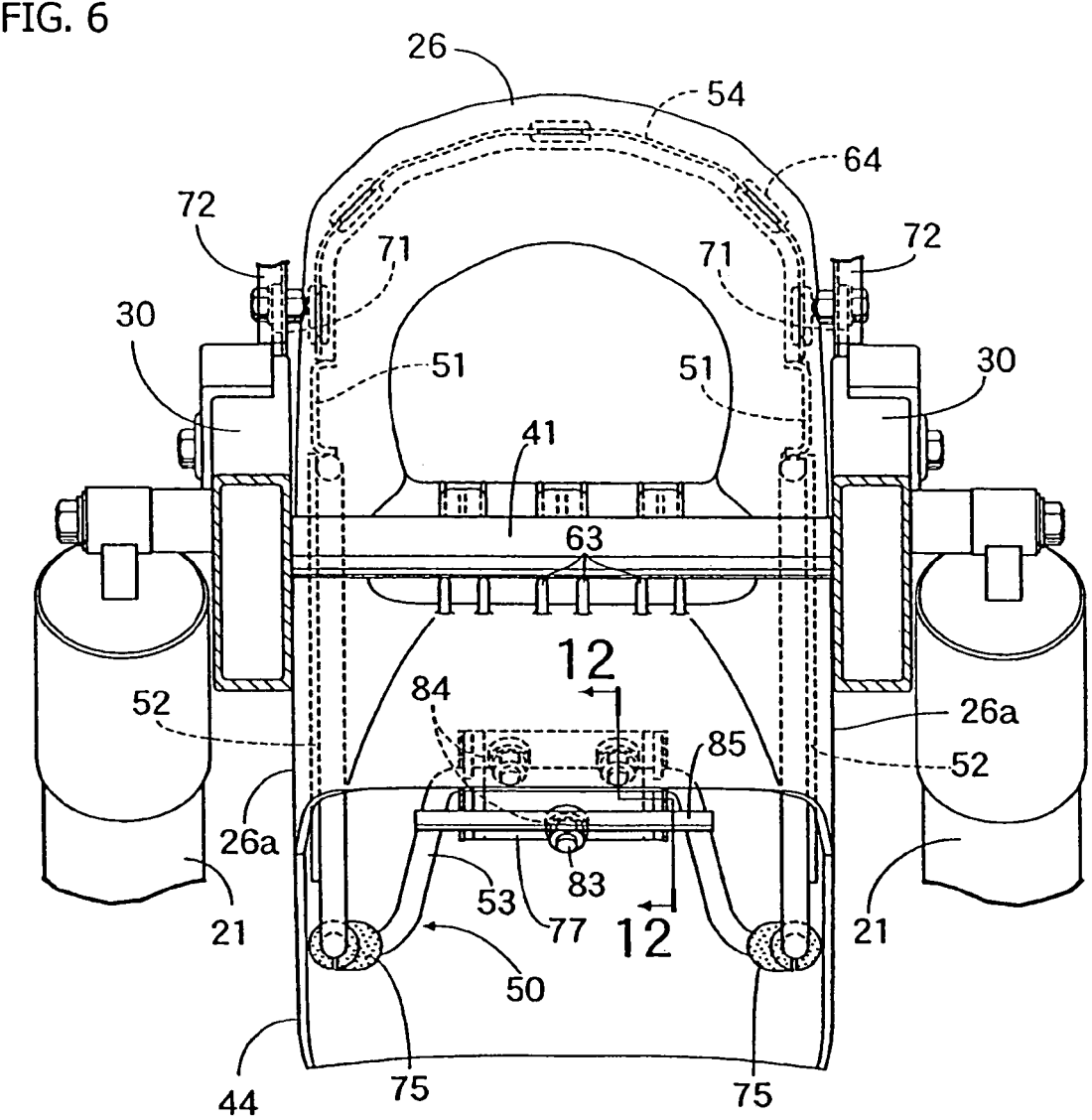
FIG. 6 is a front sectional view of the rear fender of FIG. 4, taken along the line 6—6 thereof.

As shown in FIGS. 2 and 5, the seat rails 30, 30 of the body frame F are arranged externally of both side plates 26a, 26a of the rear fender, and the seat rails extend forwardly beyond the rear fender 26, as shown.

Garnishes 49, 49, covering the outside of the seat rails 30, 30 at a portion corresponding to the rear fender 26, are arranged and provided in a length so as to extend rearwardly of both seat rails 30, 30. Each garnish 49 also has a substantially U-shaped cross sectional shape, that is oriented to open inwardly toward the rear fender 26. The rear turn indicator lamps 48, 48 are mounted on the rear ends of the garnishes 49, 49.

A support stay 50 is provided within the rear fender 26, for providing internal reinforcement and support to the rear fender 26. The support stay 50 is fastened to the seat rails 30, 30 by jointly fastening it to the rear fender 26 and the garnishes 49, 49.

Figure 7:
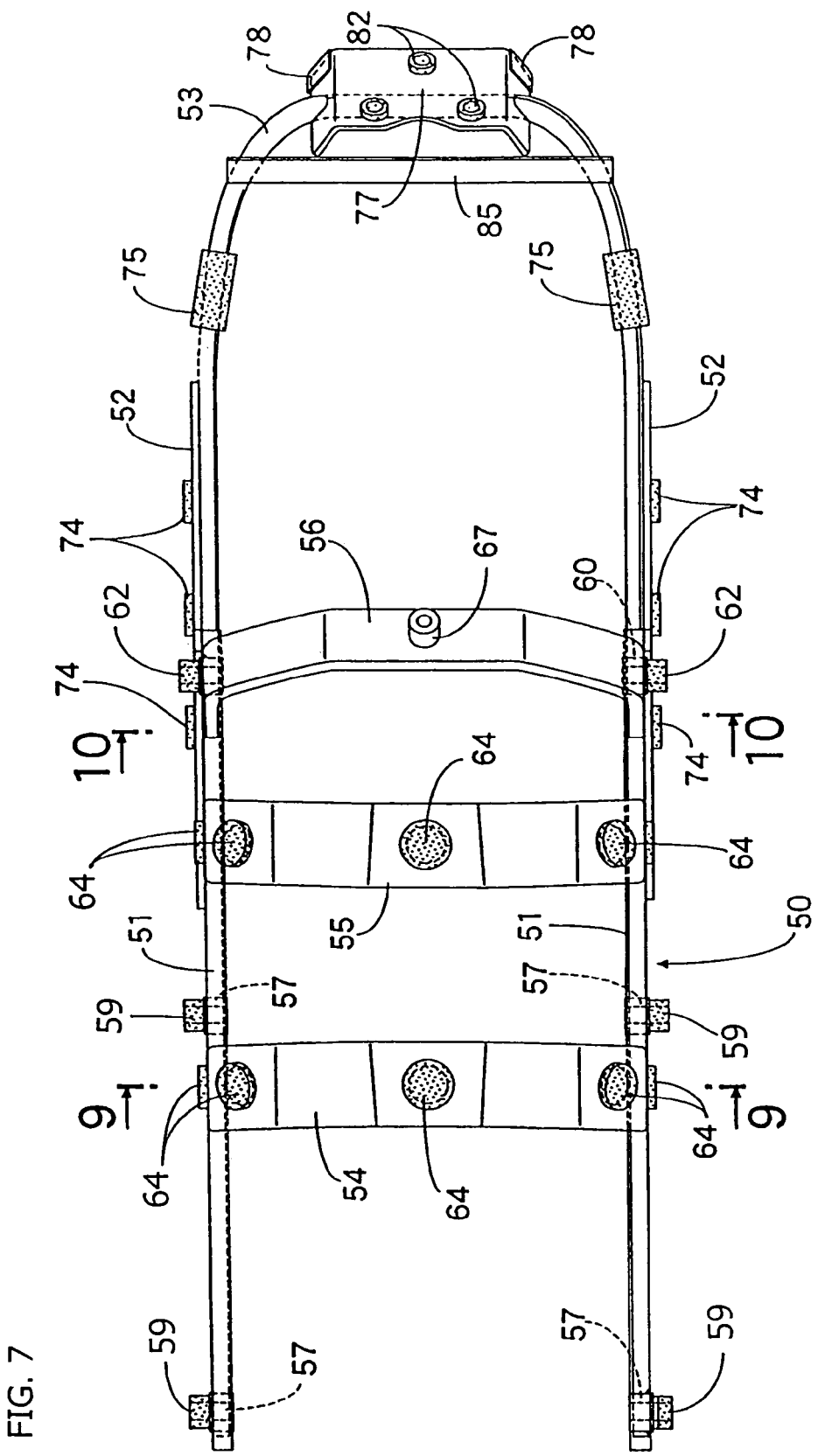
FIG. 7 is a top plan view of a support stay illustrating the locations of the fasteners used to secure the support stay to the motorcycle frame, and illustrating the locations of elastic members on the support stay.

Referring to FIG. 7 in addition to other drawings, the support stay 50 includes a pair of left and right stay bars 51L, 51R, and a pair of left and right side plate support portions 52L, 52R. The support stay 50 also includes a rear connection portion 53, front and rear upper fender support bridge sections 54 and 55, and a seat support portion 56 extending upwardly between the stay bars 51L, 51R.

The pair of left and right stay bars 51L, 51R extend in the longitudinal direction so as to oppose and confront the inside surface of the respective side plates 26a, 26a of the rear fender 26 at portions corresponding to the seat rails 30, 30. The pair of left and right side plate support portions 52L, 52R extend along the inner surface of the rear fender 26, from the respective stay bars 51L, 51R to the widened portion 44.

The connection portion 53 connects the rear ends of the respective side plate support portions 52L, 52R. The connection portion 53 bends rearwardly and upwardly from the rear ends of the respective side plate support portions 52L, 52R and the support stay 50 is formed substantially with a U-shape, as viewed from above.

The front and rear upper fender support bridges 54, 55, respectively, are mounted to the support stay 50 so as to extend between respective stay bars 51L, 51R. The upper fender support bridges 54, 55 provide support to the inside surface of the upper portion of the rear fender 26. The seat support portion 56 is mounted to support stay 50 so as to extend between the rear portions of respective stay bars 51, 51. The seat support portion 55 supports the rear portion of the pillion seat 24.

Figure 8:
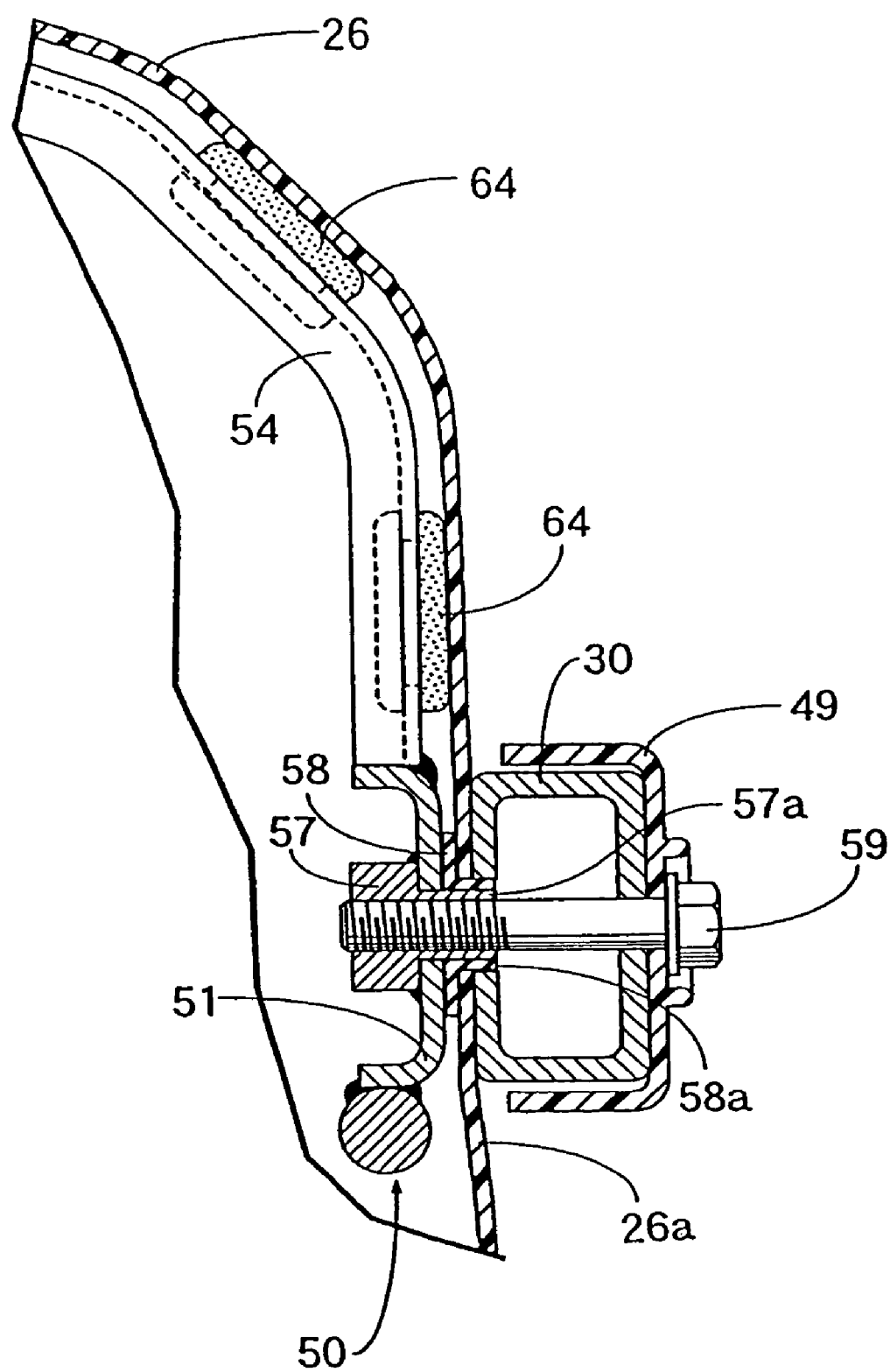
FIG. 8 is an enlarged sectional detail view of a portion of the rear fender of FIG. 5, taken on the line 8—8 thereof, and showing the configuration of the motorcycle seat rail with respect to the rear fender, and the mounting plate portion of the support stay.
Figure 10:
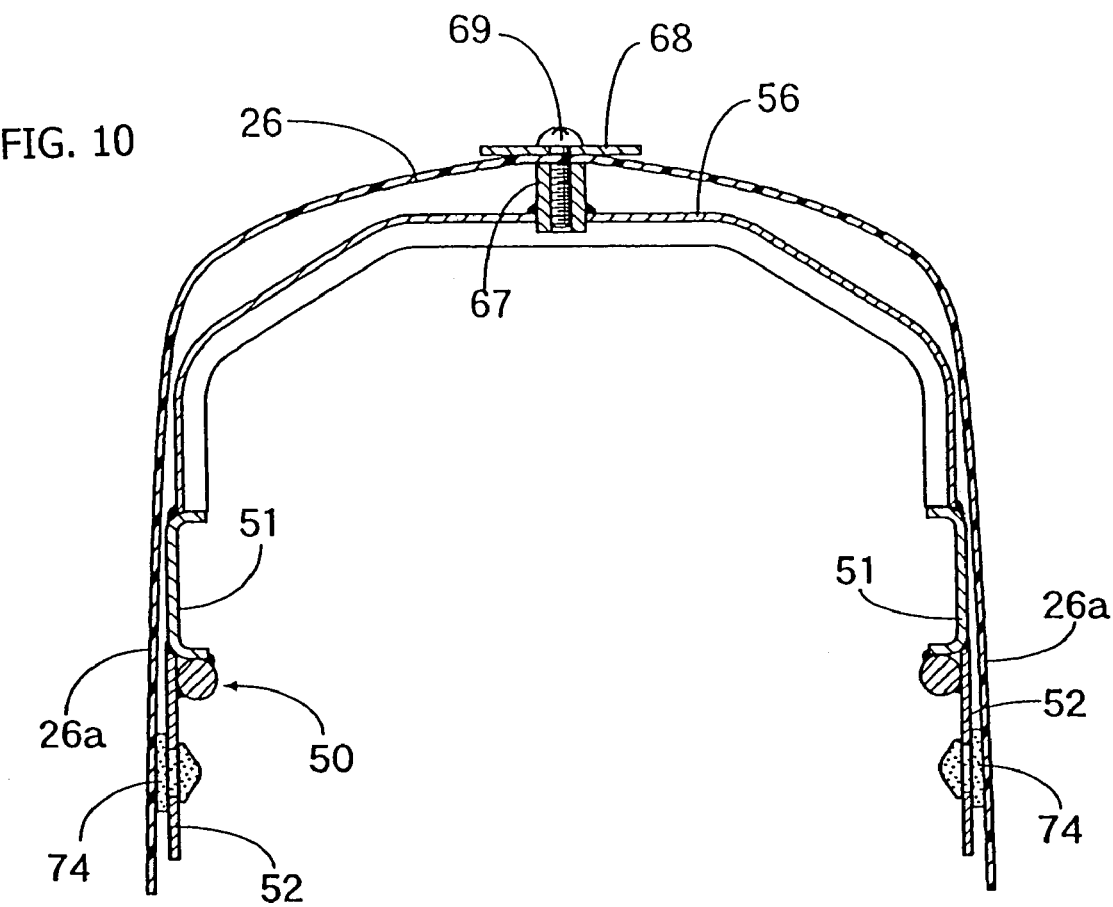
FIG. 10 is a sectional view of the rear fender and the support stay taken on the line 10—10 of FIG. 7, showing the configuration of the cylindrical support boss used to secure the rear fender to the seat support portion of the support stay.

In the support stay 50 as described, the stay bars 51L, 51R are formed of rolled steel having a substantially U-shaped cross section. The stay bars 51L, 51R are oriented to open inwardly, such that the closed portion confronts the rear fender 26 and the corresponding seat rail 30 (FIG. 8). The side plate support portions 52L, 52R are formed from a steel plate and a part of a metal rod arranged internally of the steel plate, respectively (FIG. 10).

Figure 4:
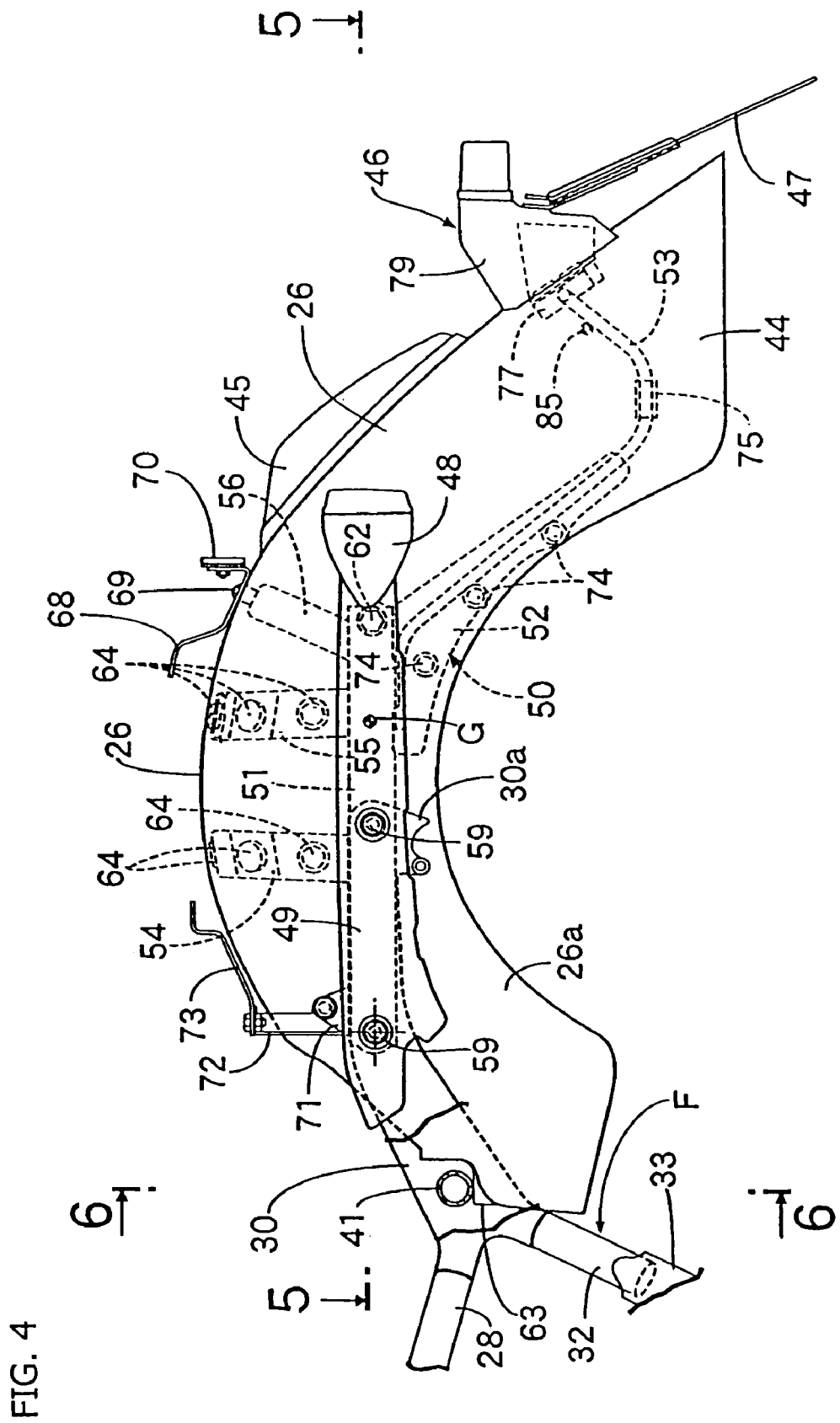
FIG. 4 is an enlarged side plan view of a rear fender of a motorcycle, showing the inventive support stay in broken lines within the rear fender.

The connection portion 53 is formed by bending and molding the remaining portions of the metal rod (FIG. 4). The upper fender support bridges 54, 55 and the seat support portion 56 are formed of the rolled steel having a substantially U-shaped cross section opened inwardly. The rolled steel is bent and molded to fit along the upper inside surface of the rear fender 26. The support stay 50 is fabricated by welding the rolled steel components and the metal rod together.

Referring to FIG. 8 in addition to other drawings, a pair of weld nuts 57 are welded to the inner surface of each respective stay bar 51 of the support stay 50. The weld nuts 57 are spaced apart in the longitudinal direction, and located at positions forward of a center of gravity position G (see FIG. 4) of the rear fender 26. Each weld nut 57 includes a cylindrical collar portion 57a that projects outward and extends through the respective stay bars 51. The cylindrical collar portions 57a are integral with the weld nuts 57.

Grommets 58 are formed of an elastic material and have cylindrical portions 58a extending integrally therefrom. Cylindrical portions 58a encircle the collar portions 57a of the weld nuts 57. The grommets 58 are positioned adjacent to weld nuts 57 and are interposed between respective side plates 26a of the rear fender 26 and the stay bars 51, positioned inward of the side plates 26a. The collar portions 57a and the cylindrical portions 58a are inserted through both side plates 26a of the rear fender 26 and into the inner portions of the seat rails 30.

On the other hand, bolts 59 are inserted through seat rails 30 from the outside and extend through the garnishes 49 the seat rails 30, the rear fender 26, and the stay bar 51. The bolts 59 engage with the weld nuts 57 and are tightened whereby the rear fender 26, the garnishes 49, and the support stay 50 are secured to the seat rails 30. That is, both sides of the rear fender 26 are secured to the seat rails 30 of the body frame F by bolts 59 at two locations on each side of the vehicle, for a total of four locations. All four locations are positioned forward of the center of gravity position G of the rear fender 26 (FIG. 4).

A pair of weld nuts 60 are also provided at a location that is to the rear of the center of gravity position G of the rear fender 26. Weld nuts 60 are welded to the inner surface of respective stay bars 51 of the support stay 50. Grommets 61, formed of elastic material, are interposed between the respective stay bars 51 and side plates 26a of rear fender 26. The side plates 26a of rear fender 26 are secured to the stay bars 51 using bolts 62 engaged with the weld nuts 60. Moreover, the bolts 62 are covered from the outside by the garnishes 49, and thus the bolts 62 are not visible from the outside of the rear fender 26.

On the other hand, for example, rear fender 26 is provided with a plurality of contact portions 63 (FIG. 4 and FIG. 6) that are capable of coming into contact with the underside of the fourth transversely oriented cross pipe 41. The fourth transversely oriented cross pipe extends between the front portions of respective seat rails 30, 30 in the body frame F. Contact portions 63 are integrally provided at the front of the rear fender 26. The contact portions 63 are formed to be rib-like, project upward, and to extend forward from the front of the rear fender 26.

Figure 9:
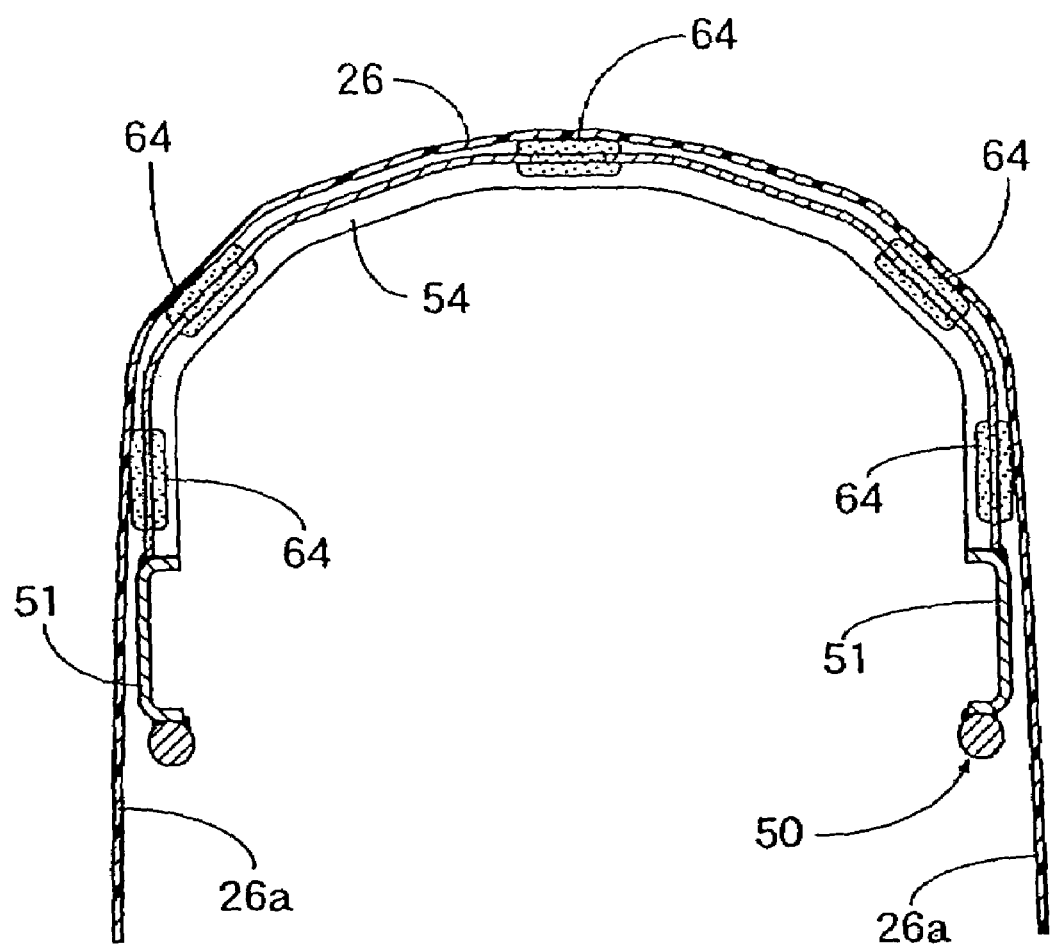
FIG. 9 is a sectional view of the rear fender and the support stay taken on the line 9—9 of FIG. 7, showing the elastic members contacting the interior surface of the rear fender.

Referring to FIG. 9 in addition to other drawings, grommets 64 are a plurality of elastic members formed of an elastic material. Grommets 64 are mounted on the front and rear upper fender support bridges 54 and 55. The front and rear upper fender support bridges 54 and 55 use grommets 64 to elastically support the upper interior portion of the rear fender 26.

In FIG. 10, a cylindrical support boss 67 is fixedly mounted on the upper surface of the seat support portion 56. The rear fender 26 is sandwiched between the upper end of the support boss 67 and a seat rear portion support plate 68. The support plate 68 is fastened to the support boss 67 by a screw member 69 engaged with the support boss 67. The rear portion of the pillion seat 24 is elastically supported by and secured to the front of the support plate 68. Further, a reflector 70 is mounted at the rear of the support plate 68.

Figure 3:
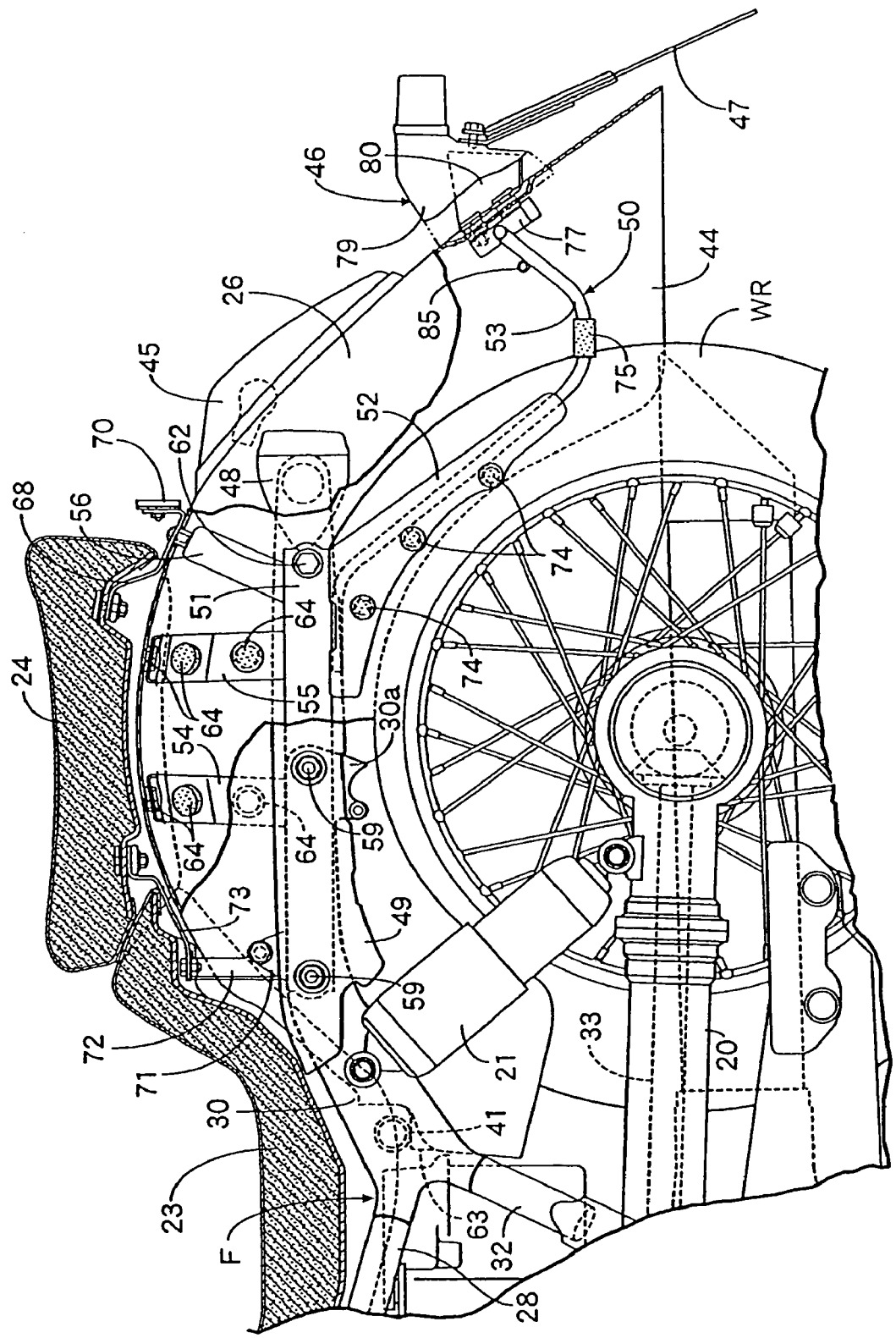
FIG. 3 is a side plan detail view, showing a rear portion of the motorcycle of FIG. 1 in an enlarged scale.

On the other hand, brackets 71, 71 project upward and are integrally provided at the front end of respective seat rails 30, 30 (FIG. 3). Support legs 72, 72 are fastened to the brackets 71, 71 and extended upward. A seat front portion support plate 73 is positioned above the front of the rear fender 26, and is fastened to the upper portion of support legs 72, 72. The front portion of the pillion seat 24 is elastically supported by and secured to the support plate 73.

Grommets 74 are a plurality of elastic members formed of an elastic material. Grommets 74 (FIG. 10) are mounted on respective side plate support 52 of the support stay 50. The side plate support portions 52 are elastically secured to the inside surface of the respective side plates 26a of the rear fender 26. Grommets 74 are provided in the region extending from the seat rails 30 of the body frame F to the widened portion 44 of the rear fender 26 (FIG. 3).

Figure 11:
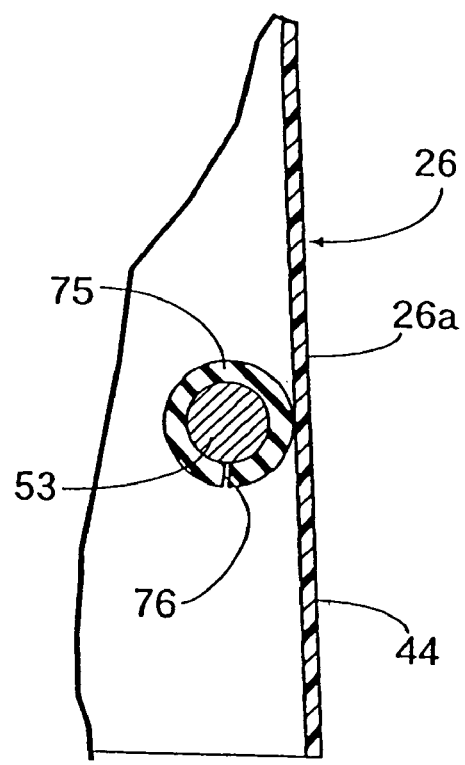
FIG. 11 is a sectional view taken on the line 11—11 of FIG. 5, showing the elastic tubes surrounding the connection portion of the support stay.

Referring to FIG. 11 in addition to other drawings, elastic tubes 75 are elastic members are formed of an elastic material. Each elastic tube 75 is provided with a slit 76 that extends along the entire axial length of the tube. The elastic tubes 75 are mounted, and adhered by adhesives, to the side plate support portion 52 of the stay 50 and the associated portion of the connection portion 53. The tubes 75 contact the inner surface of the widened portion 44 to prevent respective sides of the widened portion 44 in the rear fender 26 from moving inward.

Figure 12:
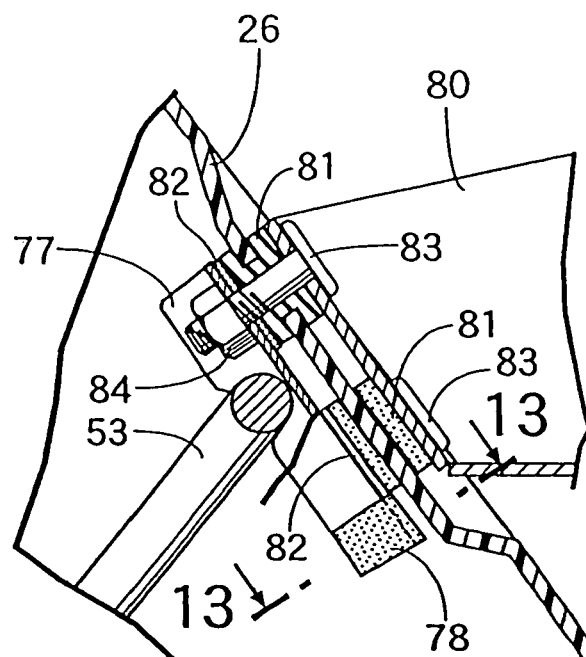
FIG. 12 is a sectional view taken on the line 12—12 of FIG. 6, showing the mounting structure of the lamp body with respect to the connection portion of the support stay.
Figure 13:
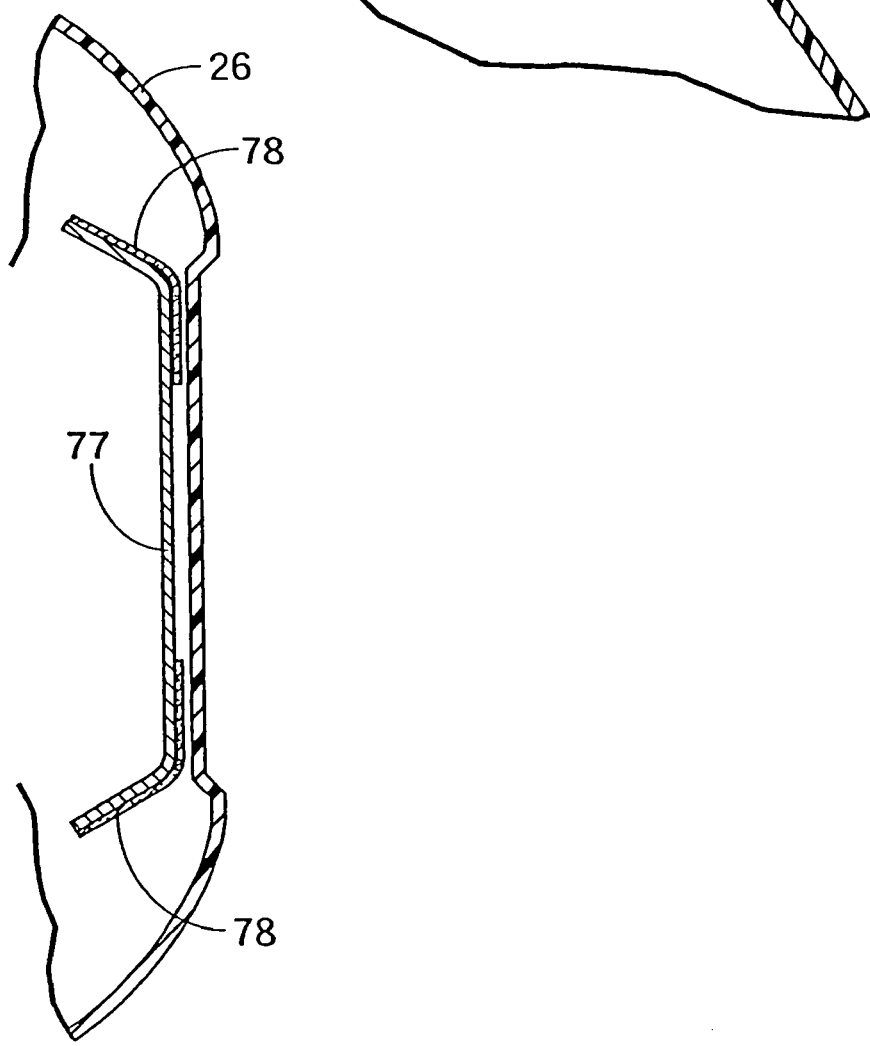
FIG. 13 is a sectional view taken on the line 13—13 of FIG. 12, illustrating elastic members provided between the lamp support plate and the rear fender.

Referring to FIG. 12 and 13 in addition to other drawings, a lamp support plate 77 lies opposed to and confronting the inside surface of the rear portion of the rear fender 26. Lamp support plate 77 is fixedly mounted on the support stay 53. Elastic members 78 are fixed to respective lower portions of the lamp support plate 77 by conventional means such as a two-sided tape (not shown). Moreover, elastic members are also adhered to portions of the surface of lamp support plate 77 opposite to the rear fender 26. The elastic materials 78 perform the function of preventing the lamp support plate 77 from coming into direct contact with the rear fender 26 when the license lamp 46 and the rear fender 26 are mounted on the lamp support plate 77.

On the other hand, a housing 79 of the license lamp 46 is mounted on a housing support plate 80 arranged within the housing 79. The housing support plate 80 is arranged so as to oppose the exterior surface of the rear fender at a portion that generally overlies the lamp support plate 77.

Moreover, elastic grommets 81, also elastic members formed of an elastic material, are mounted at a plurality of locations on the rear fender 26 between the lamp support plate 77 and the housing support plate 80. For example, three elastic grommets may be placed between the lamp support plate 77 and the housing support plate 80. One end of each of grommet 81 contacts the lamp support plate 77 through washers 82, whereas the other end of each grommet 81 contacts the housing support plate 80.

From the housing 79 side of the license lamp 46, screw members 83 are inserted through the housing support plate 80, a grommet 81, a washer 82, and the lamp support plate 77. Nuts 84 engage with portions of screw members 83 that project from the lamp support plate 77, and are tightened. Thus, the license lamp 46 is mounted, through the grommets 81, to the connection portion 53 of the support stay 50 together with the rear fender 26.

That is, the support stay 50, mounted on the seat rails 30,30 of the body frame F and arranged within the interior of the rear fender 26, elastically supports the rear fender 26, along the inside of rear fender 26, through the plurality of grommets 64, 74, 81, and the elastic tubes 75.

Next, the operation of this embodiment will be described. The rear fender 26, supported on the vehicle body frame F so as to cover the rear wheel WR from above, extends to the widened portion 44 at its rear end. The support stay 50, supporting the license lamp 46 disposed on the widened portion 44, is mounted on the body frame F so as to support the rear fender 26 along the inner surface of the rear fender 26. Therefore, both the rear fender 26, and the license lamp 46 disposed on the widened portion 44 of rear fender 26, are supported by the support stay 50.

Accordingly, it is possible to provide sufficient rigidity of the rear end of the rear fender 26 while achieving a simplified shape of the rear fender 26. It is also possible to reduce the molding cost, and to enhance design freedom with respect to the shape of the rear fender 26. Moreover, the support stay 50 is arranged internally of the rear fender 26 so that the stay 50 cannot be seen from outside, thus enhancing external appearance of the rear fender 26.

Further, the support stay 50 includes a pair of left and right side plate support portions 52 extending along the respective seat rails 30 of the body frame F to the widened portion 44 along the inner surface of the rear fender 26. The support stay 50 further includes a connection portion 53 bent rearward and upward from the rear ends of the side plate support portions 52 and formed into an substantially U-shape, as viewed from above. Connection portion 53 connects the respective rear ends of both side plate support portions 52. In addition, the connection portion 53 supports the license lamp 46. Therefore, the license lamp 46 is supported more firmly, while the connection portion 53 positively supports the widened portion 44 of the rear fender 26.

Further, the rear fender 26 is supported on the support stay 50 with the grommets 64, 74, and 81 and the elastic tubes 75 interposed between the rear fender 26 and the support stay 50. Therefore, vibrations generated in the rear fender 26 are absorbed and reduced by the grommets 64, 74, and 81 and the elastic tubes 75 that are interposed between the support stay 50 and the rear fender 26.

Moreover, since the rear fender 26 is formed of plastic, the weight of the rear fender 26 can be reduced, increasing the firmness of the support of the support stay 50.

Further, the contact portions 63 are provided at the front of rear fender 26 and contact the underside of the fourth transversely oriented cross pipe 41 of the body frame F. Both sides of the rear fender 26 are fastened to the seat rails 30, 30 of the body frame F forward of the center of gravity position G of the rear fender 26. Accordingly, as the rear fender 26 is mounted on the body frame F, the contact portions 63 at the front of the rear fender 26 are placed in contact with the underside of the fourth transversely oriented cross pipe 41. Then, while respective sides of the rear fender 26 are fastened to the seat rails 30 at each of four locations using the bolts 59, the center of gravity position G of the rear fender 26 is rearward of the temporarily fastened position. Therefore, even if the rear fender 26 is tends to rotate and move in the direction of springing up the front portion due to its own weight, the contact portions 63 contact with the body frame F to prevent such rotational movement. Thus, the assembly of the rear fender 26 into the body frame F can be accomplished more easily by the uninterrupted fastening of each bolt 59, and thus the ease of assembly of the rear fender 26 to the body frame F is enhanced.

Moreover, the contact portions 63 provided at the front of the rear fender 26 contact the underside of the fourth transversely oriented cross pipe 41 that extends between the left and right seat rails 30, 30 provided on the body frame F. Therefore, the contact area between the fourth transversely oriented cross pipe 41 and the contact portions 63 is relatively large, and the rotational movement of the rear fender 26 are positively prevented so as to stabilize the rear fender 26 during assembly.

Further, since a plurality of contact portions 63 are formed to be rib-like, to project upward, and to extend forward from the front of the rear fender 26, the contact portions 63 reinforce the rear fender 26. Thus the rigidity of the rear fender 26 is enhanced.

While the embodiments of the present invention have been described above, it is noted that the present invention is not limited to the aforementioned embodiments, but various changes in design can be made without departing the present invention described in claims.

For example, while in the above embodiments, the rear fender 26 is made of plastic, other materials may be employed, including, but not limited to, metals or a light alloys such as aluminum. Further, while in the above embodiments, the rear fender 26 is elastically supported on the support stay 50, the rear fender may also be supported by the support stay without providing interposing elastic members.

Although the present invention has been described herein with respect to a limited number of presently contemplated embodiments, the foregoing description is intended to be illustrative, and not restrictive. Those skilled in the art will realize that many modifications of the described embodiments could be made, which would be operable. All such modifications, which are within the scope of the claims, are intended to be within the scope and spirit of the present invention.

We claim:

1. A motorcycle, comprising:
a body frame comprising two spaced-apart seat rails; a rear wheel rotatably attached to a rear portion of the body frame; a rear fender for partially covering said rear wheel, the rear fender comprising an integral rear end which is extended downwardly and a pair of spaced apart side plates, wherein the seat rails of the body frame are arranged externally of the rear fender side plates; and a support stay for supporting the rear fender on the body frame; wherein the rear fender is formed having an inverted substantially U-shaped cross section such that a lower portion of the rear fender is open, the rear fender being supported on the body frame and partially covering the rear wheel, the rear fender comprising a proximal end adjacent a seat, and a distal end adjacent a rearmost surface of the rear wheel, wherein the side plates are arranged on opposite sides of the rear wheel, each of the respective side plates comprising a widened portion at the downwardly extended rear end of the rear fender such that the side plates have a maximum dimension in a radial direction of the rear wheel at a lower edge of the distal end of the rear fender; wherein said support stay is disposed along an inner surface of said rear fender and supports the widened portion from inside the rear fender; and wherein a lamp body is disposed on said widened portion, the lamp body being mounted on a connecting portion of said support stay.

2. The motorcycle of claim 1, wherein the support stay comprises: a pair of left and right side support portions, respectively extending along an inner side of said rear fender between said body frame and said widened portion, said side support portions operatively attached to and extending downwardly from said seat rails, and the connecting portion extending between rear ends of said side support portions, and integrally formed thereon, such that the support stay is formed substantially in a U-shape; wherein a portion of said connecting portion comprises a metal rod which extends rearwardly and upwardly from respective rear ends of said side support portions; wherein the lamp body is supported on said connecting portion.

3. The motorcycle of claim 1, further comprising a plurality of elastic members interposed between the support stay and the rear fender.

4. The motorcycle of claim 2, further comprising a plurality of elastic members interposed between the support stay and the rear fender.

5. The motorcycle of claim 1, wherein said rear fender is formed of synthetic plastic.

6. The motorcycle of claim 1, wherein a portion of said support stay extends below said lamp body as to contact the widened portion at an area below said lamp body.

7. A motorcycle, comprising:
a body frame; a rear wheel rotatably attached to a rear portion of the body frame; a rear fender for partially covering said rear wheel, the rear fender comprising a pair of spaced apart side plates; and a support stay for supporting the rear fender on the body frame; wherein the rear fender is formed having an inverted substantially U-shaped cross section such that a lower portion of the rear fender is open, the rear fender being supported on the body frame and partially covering the rear wheel, wherein the side plates are arranged on opposite sides of the rear wheel, each of the respective side plates comprising a widened portion at a rear end thereof, the widened portion of each side plate being larger than other portions of the side plate; wherein said support stay is disposed along an inner surface of said rear fender and extends between the body frame and the widened portion of said rear fender so as to support the widened portion from inside the rear fender; wherein a lamp body is disposed on said widened portion, the lamp body being mounted on the support stay; in which a contact portion is provided at a front of said rear fender, wherein the contact portion is in contact with an underside of a portion of the body frame, and wherein the side plates of the rear fender are fastened to the body frame at respective portions thereof forward of a center of gravity of the rear fender, wherein the contact portion comprises a plurality of integrally formed ribs that project forwardly and upwardly on the front of the rear fender.

8. The motorcycle of claim 7, wherein said contact portion is provided at the front of the rear fender so as to contact an underside of a cross member of the body frame, the cross member extending between a pair of left and right body frame members.

9. A fender structure for covering a portion of a rear wheel of a vehicle, the fender structure comprising: a fender body and a support stay for supporting the fender body on a body frame of the vehicle, wherein the fender body comprises a pair of spaced apart side plates for covering side portions of the rear wheel, a bight portion extending between upper edge portions of said side plates, a proximal end for placement adjacent the body frame, and a distal end opposed to the proximal end for placement spaced from the body frame; said bight portion comprising an inwardly curved upper portion joining the side plates above the rear wheel and forming a closed upper portion of the fender body, each of the respective side plates comprising a widened portion at the distal end of the fender body such that the side plates have a maximum dimension in a radial direction of the rear wheel at a lower edge of the distal end of the rear fender; wherein the support stay supports the fender body from within an interior thereof such that the support stay is not visible from an exterior of the fender body, the support stay extending from the body frame of the vehicle at the proximal end to the distal end of the fender body; wherein a lamp assembly is mounted to the exterior of the fender body such that it is positioned on the widened portion and such that it is supported by the support stay; wherein the lamp assembly comprises an inner plate, and an outer plate, wherein the inner plate is fixedly mounted to the support stay within the widened portion, the outer plate supports a lamp housing thereon, the outer plate confronting the exterior of the fender body at a location that overlies the inner plate, and the outer plate is secured to the inner plate through the bight of the fender body.

10. The fender structure of claim 9, wherein first elastic members are provided between the outer plate and an exterior surface of the fender body, and wherein second elastic members are provided between the inner plate and an interior surface of the fender body.

11. A fender structure for covering a portion of a rear wheel of a vehicle, the fender structure comprising: a fender body and a support stay for supporting the fender body on a body frame of the vehicle, wherein the fender body comprises a pair of spaced apart side plates for covering side portions of the rear wheel, a bight portion extending between upper edge portions of said side plates, a proximal end for placement adjacent the body frame, and a distal end opposed to the proximal end for placement spaced from the body frame; said bight portion comprising an inwardly curved upper portion joining the side plates above the rear wheel and forming a closed upper portion of the fender body, each of the respective side plates comprising a widened portion at the distal end of the fender body, wherein a horizontal width of each of the respective side plates at the widened portion thereof is greater than a vertical height of each of the respective side plates in a radial direction of the rear wheel at an area of the fender body above the rear wheel; wherein the support stay supports the fender body from within an interior thereof such that the support stay is not visible from an exterior of the fender body, the support stay extending from the body frame of the vehicle at the proximal end to the distal end of the fender body, wherein the support stay extends along both sides of the rear wheel, and wherein the support stay comprises a proximal end portion, an intermediate portion, and a distal end portion, the proximal end portion comprises a rigid body comprising a U-shaped cross section, the proximal end portion oriented such that an open side of the section opens toward the rear wheel, the proximal end portion secured to the body frame of the vehicle and extending toward the distal end, the intermediate portion extending between the proximal end portion and the distal end portion, the distal end portion comprising a rigid rod, the rigid rod having a first end which is fixed to the intermediate portion on a first side of the rear wheel, the rigid rod having a second end which is fixed to the intermediate portion on a second side of the rear wheel, the rigid rod having a mid portion between the first end and the second end, wherein the mid portion is curved upward and toward the distal end and generally conforms to the shape of the interior of the rear end of the fender body.

12. The fender structure of claim 11 wherein the proximal end portion comprises plural upper support members, each upper support member comprising a rigid body extending from the first side of the rear wheel to the second side of the rear wheel, and each upper support member supporting the closed upper portion of the fender body.

13. The fender structure of claim 12 wherein a contact portion is provided at the front of the fender body, wherein the contact portion is in contact with a portion of the body frame of the vehicle, and wherein the side plates of the fender body are respectively fastened to the support stay at areas thereof located forward of a center of gravity of the fender body.

14. The fender structure of claim 13, wherein the contact portion is provided at the front of the fender body so as to contact an underside of a cross member of the body frame, the cross member extending between a pair of left and right body frame members.

15. The fender structure of claim 14, wherein the contact portion comprises a plurality of integrally formed ribs that project forwardly and upwardly on the front of the rear fender.

16. The fender structure of claim 12 wherein first and second elastic bodies are interposed between the fender body and the support stay.

17. The fender structure of claim 16 wherein third elastic bodies are provided between the proximal end portion and the fender body, fourth elastic bodies are provided between the distal end portion and the fender body, and fifth elastic bodies are provided between the upper support members and the fender body.

* * * * *